United States Patent [19]

Sado et al.

[11] Patent Number: 4,551,818
[45] Date of Patent: Nov. 5, 1985

[54] ELECTRONIC APPARATUS FOR TRANSLATING ONE LANGUAGE INTO ANOTHER

[75] Inventors: Ichiro Sado; Juji Kishimoto, both of Tokyo; Masayuki Sasaki, Yokohama; Mitsuo Cho, Ina, all of Japan

[73] Assignee: Canon Kabushiki Kaisha, Tokyo, Japan

[21] Appl. No.: 575,722

[22] Filed: Feb. 1, 1984

Related U.S. Application Data

[63] Continuation of Ser. No. 144,216, Apr. 28, 1980, abandoned.

[30] Foreign Application Priority Data

May 8, 1979 [JP] Japan .................................. 54-55266

[51] Int. Cl.[4] ............................................ G06F 15/38
[52] U.S. Cl. .................................... 364/900; 364/419
[58] Field of Search ... 364/200 MS File, 900 MS File, 364/419, 710

[56] References Cited

PUBLICATIONS

"Language Translator", published in Scientific American, Feb. 1979, pp. 4-5.

*Primary Examiner*—Eddie P. Chan
*Attorney, Agent, or Firm*—Fitzpatrick, Cella, Harper & Scinto

[57] ABSTRACT

An electronic apparatus has a first memory storing therein a plurality of data comprising a first lingual words and a second lingual words corresponding respectively thereto, and a second memory for storing information to freely read out at least one of said plurality of data stored in the first memory. The apparatus further has means for reading out the information stored in the second memory and reading out, on the basis of the information read out, the second lingual word relating thereto from the first memory.

10 Claims, 2 Drawing Figures

ELECTRONIC APPARATUS FOR TRANSLATING ONE LANGUAGE INTO ANOTHER

This application is a continuation of application Ser. No. 144,216 filed Apr. 28, 1980 now abandoned.

BACKGROUND OF THE INVENTION

1. Field of the Invention

This invention relates to an electronic apparatus suited to aid a user in memorizing and learning information forming a pair of data, for example, words of one language and their Japanese equivalents.

2. Description of the Prior Art

Word cards have heretofore been used by students to learn and memorize information forming a pair of data, for example, words of one language and their Japanese equivalents. In a more or less advanced stage of learning, it is often the case that at a glance at a word of the one language, the student can remember its Japanese equivalent. But often some words are difficult to remember and in such cases, it has been common practice to pick out cards bearing difficult words and have the student specially and deliberately review these words, thereby enhancing the learning efficiency.

SUMMARY OF THE INVENTION

It is an object of the present invention to provide an electronic apparatus for aiding a student in memorizing and learning which performs such a function.

It is another object of the present invention to provide an electronic apparatus designed such that particularly important information or information that is desired to be preserved for review can be stored in a special memory.

It is still another object of the present invention to provide an electronic apparatus having a first memory storing therein a plurality of bits of information, a second memory for selectively storing therein some of said plurality of bits of information stored in the first memory, and means for reading out the contents of said second memory.

It is yet still another object of the present invention to provide an electronic apparatus having a first memory storing therein a plurality of data comprising first words in one language and second words in a second language corresponding respectively to the first words, a second memory for storing information for freely reading out at least one of the plurality of data stored in said first memory, and means for reading out the information stored in said second memory and further reading out, on the basis of the information read out, the second word relating thereto from said first memory.

The invention will become more fully apparent from the following detailed description thereof taken in conjunction with the accompanying drawings.

DESCRIPTION OF THE PREFERRED EMBODIMENTS

In describing the embodiments of the present invention, English is taken as a first language and Japanese as a second language. Of course, the concept of the present invention is applicable for other languages.

The present invention will hereinafter be described with reference to the drawings.

Figure 1:
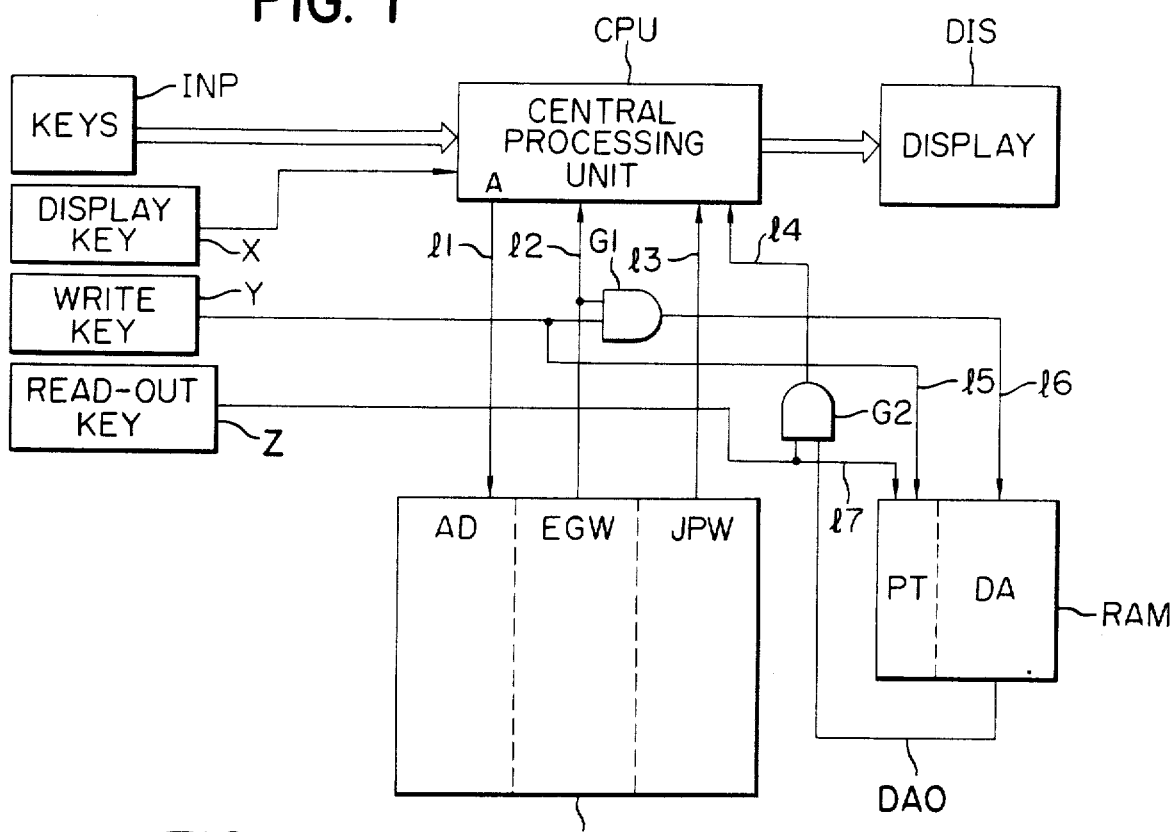
FIG. 1 is a block diagram showing an embodiment of the electronic apparatus according to the present invention.

In FIG. 1, which shows an embodiment of the present invention, a ROM is a read-only memory, e.g., fixed memory. At each address AD of the fixed memory ROM, there are stored a plurality of binary codes EGW (constituting first information) corresponding to English words and a plurality of binary codes JPW (constituting second information) corresponding to Japanese words respectively equivalent to the English words. X designates a key signal generator that may comprise a plurality of keys for causing an English word and its Japanese equivalent to be read out from the fixed memory ROM thereby permitting the English and equivalent Japanese words to be displayed. INP denotes other key group comprising a plurality of keys for instructimg the apparatus to perform various functions as hereinafter described. CPU designates a central processing unit which receives the input signal from the key X signal generator designating the English and equivalent Japanese words to be studied. The CPU then delivers an address signal to the address AD of ROM corresponding to the designated words to be studied through a signal line 11 on the basis of the key signal input from the key signal generator, and receives back from the ROM a binary code EGW corresponding to the English word stored at the address designated, through a signal line 12, and a binary code JPW corresponding to the Japanese word equivalent to the English word, through a signal line 13.

The central processing unit CPU first delivers the designated binary code EGW to a display device DIS, which displays the corresponding English word in ordinary characters. By operating a specific one of the instruction keys in the key group INP, it is also possible to have the Japanese equivalent word displayed on the display device DIS. Further, the central processing unit CPU may receive information from a RAM, to be described hereinafter, on a signal line 14, to be delivered to the display device DIS. At the same time, to coordinate this RAM information with the corresponding English word represented by the code EGW, the addresses AD in the address portion of ROM are successively addressed until the English word code EGW corresponding to the RAM information delivered to the CPU on signal line 14 is located. Then the corresponding Japanese word code JPW is introduced to the CPU from ROM through the signal line 13. The RAM is a memory which is capable of having data written thereinto and read thereoutof, such as, for example, a random access memory. The RAM is particularly useful for memorizing specific information relating to the languages which the student especially wishes to learn or review. For example, it is to be understood that the RAM writes or reads out a plurality of English words successively in a stack form.

Y is a key for selectably causing information to be written into the memory RAM. With this write key Y, a write instruction is delivered to the pointer PT of the memory RAM, to selectively address successive addresses therein through a signal line 15 into which data is to be written. The Y key output is also supplied to an AND gate G1 along with the EGW output on line 12 from the fixed memory device ROM, so that the EGW code read out at the time of the write instruction is also delivered into the data section DA of the memory RAM to the address then selected by the pointer PT through a signal line 16.

Z designates the read-out key for the memory RAM. The key output thereof is supplied to the pointer PT of RAM through a signal line 17 and is also supplied to an AND gate G2. This AND gate G2 is also supplied with the data output DAO from RAM, and the data output DAO, read out from RAM at the time the Z key is actuated, is supplied to the central processing unit CPU through the signal line 14, as described above.

Operation will not be described. Assume that the student has operated the key signal generator INP and the display key X to designate an English word, for example, "PATENT" for display and has operated the appropriate key in the group INP to cause the English word to be displayed on the display DIS. The word "PATENT" is then read out from the memory ROM in accordance with the address determined by CPU. Here, the student may or may not wish to look at the Japanese equivalent of the designated English word. If the student wants to look at the Japanese equivalent, he or she may operate the appropriate key of the group INP to cause the Japanese equivalent to be displayed on the display device DIS. When the student thinks it will be necessary or desirable to review the word "PATENT" at a later time, he or she depresses the write key Y while that word is being read out from the ROM. When the key Y has been depressed, the data at the address of the ROM being delivered to the CPU remains unchanged but at that time, the code EGW representing the English word "PATENT" entered through the signal line 12 to the CPU is also delivered into the data portion DA of the random access memory RAM through the AND gate G1. Furthermore, by operation of the Y key signal, the pointer PT of RAM is varied by +1 to address the next succeeding address of the data portion DA either before or after the information on the word "PATENT" has been written into the RAM. Thus, EGW codes are successively written into this RAM in a stack form as the write key Y is actuated.

Thereafter, each time the student depresses the key Z during the later review as desired, the EGW codes successively written into the data section DA of RAM are successively delivered in stack form to CPU through the AND gate G2 and signal line 14 and are successively displayed on the display device DIS. More particularly, with each operation of the key Z, −1 is applied to the pointer PT of RAM to successively inspect each address therein in descending order. At the time he or she reaches the word "PATENT", if he or she wants to look at the Japanese equivalent of the English word "PATENT", he or she may operate the specific key of the key group INP already described to change the display from the English word to the Japanese equivalent since both are supplied to the CPU from the ROM. This thus causes the Japanese equivalent " " of "PATENT" to be displayed on the display device DIS.

It is also possible to operate the write key Y to thereby cause the code EGW for an English word and the corresponding code JPW for the corresponding Japanese word to be memorized in the form of a pair of data by the data section DA of RAM, or to operate the key Y to cause the address AD of ROM addressed at a particular time to be memorized by RAM. When the read-out key Z is operated in this latter case the ROM address written into the data section DA of RAM would then be read out to cause the content of this ROM address to be delivered from ROM to CPU and displayed on the display device DIS as described above. Also, in case where it is necessary for a word not memorized by ROM to be entered into RAM by the key group INP, such INP output may be supplied to an OR gate with the output of the AND gate G1 and the OR output may be transferred to the data section DA of the memory RAM through a signal line 16.

The memory capacity of the ROM may be, for example, 128-kilobits which can accommodate one thousand English words. The RAM may be one having capacity sufficient to memorize ten to thirty English words. These capacities can provide an apparatus very useful for successful learning of languages. In the foregoing description, the form of English-Japanese translation has been adopted, but learning in the form of Japanese-English translation could be easily provided for by interchanging the codes EGW and JPW with each other in the ROM.

As has been described above, the present invention has the effect of enabling one to efficiently memorize and learn a foreign language.

Figure 2:
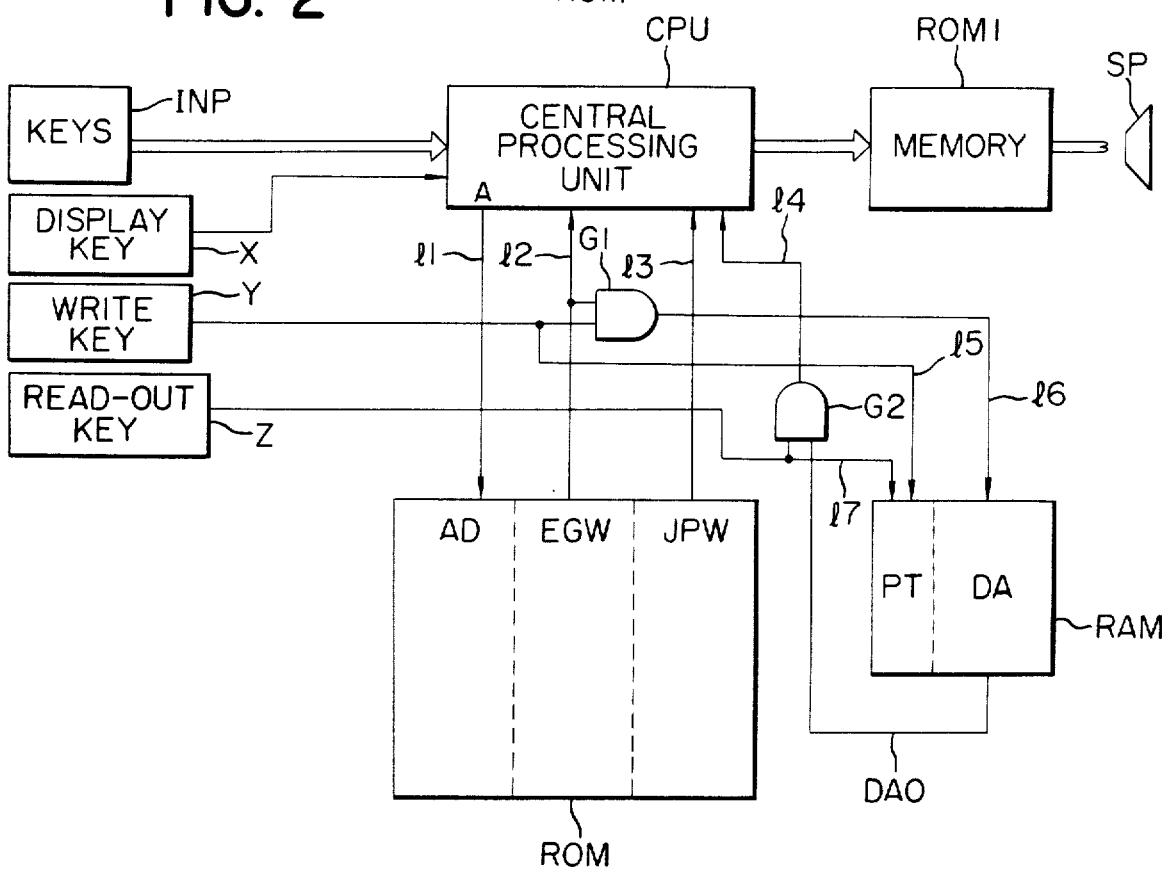
FIG. 2 is a block diagram showing another embodiment of the present invention.

In the above-described embodiment, information is communicated to the student by use of visual display means. But as shown in FIG. 2, the display means may be replaced by a memory ROM1 which has stored therein quantized pronunciation of words and with the information read out from the fixed memory device ROM as addressed, the pronunciation of each word is accessed from said memory ROM1 and supplied to a speaker SP. Therefore it is possible to obtain a voice output instead of visual display. It will be realized that in the embodiment as shown in FIG. 2, the same components as those of FIG. 1 are designated by the same reference numerals and function in the same manner.

What is claimed is:

1. An electronic apparatus for translating one language into another in which selected words can be stored for review, said apparatus comprising:

first memory means for storing words of a first language and words of a second language as a plurality of pairs;

second memory means for storing selected ones of the words of said first language stored in said first memory means;

first read out means including means for producing a first read out signal for causing reading out of a selected word of said first language stored in said first memory means;

means connecting said first memory means and said second memory means;

writing means including input means, connected to said connecting means, for producing a writing instruction, said connecting means being responsive to said writing instruction for enabling writing of said selected word read out from said first memory means into said second memory means;

second read out means, connected to said second memory means, including means for producing a second read out signal for reading out a selected one of the words of said first language stored in said second memory means translation means including means for producing a translation signal for causing reading out from said first memory means a word of said second language corresponding to a word of said first language;

visualizing means for visualizing said words of said first language caused to be read out by said first read out means, words of said first language read out by said second read out means, and words of said second language caused to be read out by said translation means, respectively; and control means connected to said first read out means, said second read out means, said translation means, said visualizing means, and said first memory and being responsive to generation of said first read out signal by said first read out means for reading out said selected word of said first language stored in said first memory means, and being responsive to generation of said translation signal by said translation means to find and read out from said first memory means the words of said second language corresponding to said selected word of said first language read out from said second memory means by said second read out means and visualized by said visualizing means.

2. An electronic apparatus according to claim 1, wherein said second memory means comprises a stack memory.

3. An electronic apparatus according to claim 1, wherein said second memory has a capacity for storing a plurality of said selected ones of the words of said first language.

4. An electronic apparatus according to claim 1, wherein said first memory means is a read only memory.

5. An electronic apparatus according to claim 4, wherein said second memory means is a read-write memory.

6. An electronic apparatus according to claim 1, wherein said second memory means is a read-write memory.

7. An electronic translating apparatus comprising:
first memory means for storing a plurality of words of a first language and corresponding words of a second language;
second memory means for storing desired words of said plurality of words of said first language;
first read out means including an actuatable first read out key for causing reading out of each of said plurality of words of said first language;
address generating means, connected to said first read out means and to said first memory, for generating an address signal in response to actuation of said first read out key to access each of said plurality of words of said first language and corresponding words of said second language stored in said first memory means; and thereafter for renewing said address signal generated thereby;

means connecting said first memory means and said second memory means;
write means connected to said connecting means, and including an actuatable write key for generating a storage address signal for enabling said connecting means to write, at an address designated by said storage address signal, a desired word of said plurality of words of said first language stored in said first memory means into said second memory means, and then for renewing said storage address signal generated thereby;
second read out means, connected to said second memory means, including an actuatable second read out key for generating a read out address signal for reading out one of said desired words of said first language from said second memory means from an address designated by said read out address signal, and then for renewing said read out address signal;
translation means for producing a translation signal for causing reading out from said first memory means a word of said second language corresponding to a word of said first language;
visualizing means for visualizing each of said plurality of words of said first language caused to be read out by said first read out means, each of said desired words of said first language read out by second read out means, and words of said second language caused to be read out by said translation means; and
control means connected to said address generating means, said second read out means, said translation means, and said visualizing means, and being responsive to an address signal generated by said address generating means for reading out one of said plurality of words of said first language stored in said first memory means, and being; responsive to generation of said translation signal by said translation means to find and read out from said first memory means words of said second language corresponding to said one of said desired words of said first language read out from said second memory means by said second read out means and visualized by said visualizing means.

8. An electronic translating apparatus according to claim 7, wherein said address generating means is connected to said second read out means and renews said address signal in response to actuation of said second read-out key.

9. An electronic translating apparatus according to claim 7, wherein said first memory means comprises a read only memory.

10. An electronic translating apparatus according to claim 7, wherein said second memory means comprises a stack memory.

* * * * *

UNITED STATES PATENT AND TRADEMARK OFFICE
CERTIFICATE OF CORRECTION

PATENT NO. : 4,551,818
DATED : November 5, 1985
INVENTOR(S) : ICHIRO SADO, ET AL.

It is certified that error appears in the above-identified patent and that said Letters Patent is hereby corrected as shown below:

Column 2, line 17, change "denotes other" to --denotes another--;
line 18, change "instructimg" to --instructing--;
lines 21-22, change "key X signal generator" to --key signal generator X--; and
line 27, change "key signal generator, and" to --key signal generator X, and--.

Column 3, line 11, change "will not" to --will now--;
lines 12-13, change "key signal generator INP and the display key X" to --key signal generator X--; and
line 36, change "successing" to --succeeding--.

Column 4, line 63, change "memory means" to --memory means;--.

Column 5, line 17, change "the words" to --the word--;
line 26, change "second memory has" to --second memory means has--; and

UNITED STATES PATENT AND TRADEMARK OFFICE
CERTIFICATE OF CORRECTION

PATENT NO. : 4,551,818
DATED : November 5, 1985
INVENTOR(S) : ICHIRO SADO, ET AL.

It is certified that error appears in the above-identified patent and that said Letters Patent is hereby corrected as shown below:

Column 5, line 50, change "said first memory, for" to --said first memory means, for--.

Column 6, line 37, change "being; responsive" to --being responsive--.

Signed and Sealed this

Twenty-sixth Day of August 1986

[SEAL]

Attest:

DONALD J. QUIGG

Attesting Officer

Commissioner of Patents and Trademarks